(12) United States Patent
Srinivasan et al.

(10) Patent No.: US 10,445,433 B2
(45) Date of Patent: Oct. 15, 2019

(54) METHODS AND SYSTEMS OF QUERY ENGINES AND SECONDARY INDEXES IMPLEMENTED IN A DISTRIBUTED DATABASE

(71) Applicants: Venkatachary Srinivasan, Sunnyvale, CA (US); Rajkumar Iyer, Bangalore (IN); Sunil Sayyaparaju, Bangalore (IN)

(72) Inventors: Venkatachary Srinivasan, Sunnyvale, CA (US); Rajkumar Iyer, Bangalore (IN); Sunil Sayyaparaju, Bangalore (IN)

(*) Notice: Subject to any disclaimer, the term of this patent is extended or adjusted under 35 U.S.C. 154(b) by 409 days.

(21) Appl. No.: 14/697,617

(22) Filed: Apr. 27, 2015

(65) Prior Publication Data
US 2015/0331910 A1 Nov. 19, 2015

Related U.S. Application Data

(60) Provisional application No. 61/985,051, filed on Apr. 28, 2014.

(51) Int. Cl.
G06F 17/30 (2006.01)

(52) U.S. Cl.
CPC .. *G06F 17/30575* (2013.01); *G06F 17/30327* (2013.01); *G06F 17/30483* (2013.01); *G06F 17/30864* (2013.01)

(58) Field of Classification Search
USPC .......................... 707/706, 713, 718
See application file for complete search history.

(56) References Cited

U.S. PATENT DOCUMENTS

2010/0114970 A1* 5/2010 Marin ............... G06F 17/30864
707/802
2014/0095483 A1* 4/2014 Toillion ............ G06F 17/30442
707/722

* cited by examiner

*Primary Examiner* — Hung T Vy

(57) ABSTRACT

In one embodiment, a computer-implemented method of a distributed database system included the step of providing a query processor to receive a query request and to chart out a query execution plan based on the query request. The method includes the step of providing a data generator to generate a digest list based on the query request, wherein the list of digests comprises each stream or filter applied in servicing the query request. The method includes the step of providing a query engine to obtain a digest list from a multiple-data source as a result of the query request and to filter the digest list. The method includes the step of providing a query worker to obtain the query request and process the query request based on a type of the query request. The method includes the step of providing one or more query worker threads to perform an asynchronous I/O operation for the query request.

13 Claims, 9 Drawing Sheets

METHODS AND SYSTEMS OF QUERY ENGINES AND SECONDARY INDEXES IMPLEMENTED IN A DISTRIBUTED DATABASE

CROSS-REFERENCE TO RELATED APPLICATIONS

This application claims priority from U.S. Provisional Application No. 61/985,051, filed Apr. 28, 2014. This application is hereby incorporated by reference in its entirety for all purposes.

1. FIELD

This application relates generally to data bases, and more specifically to a system, article of manufacture and method of methods and systems of a query engines and secondary indexes implemented in a distributed database.

2. RELATED ART

A query engine can be implemented in a database system. Improvements to the methods and systems of the query engine can improve the operation the database system.

BRIEF SUMMARY OF THE INVENTION

In one embodiment, a computer-implemented method of a distributed database system included the step of providing a query processor to receive a query request and to chart out a query execution plan based on the query request. The method includes the step of providing a data generator to generate a digest list based on the query request, wherein the list of digests comprises each stream or filter applied in servicing the query request. The method includes the step of providing a query engine to obtain a digest list from a multiple-data source as a result of the query request and to filter the digest list. The method includes the step of providing a query worker to obtain the query request and process the query request based on a type of the query request. The method includes the step of providing one or more query worker threads to perform an asynchronous I/O operation for the query request, wherein the one or more query work threads run in parallel for a given query using an SSD-level parallelism attribute, and wherein a query worker thread comprises an event-based I/O thread.

Figure 1:
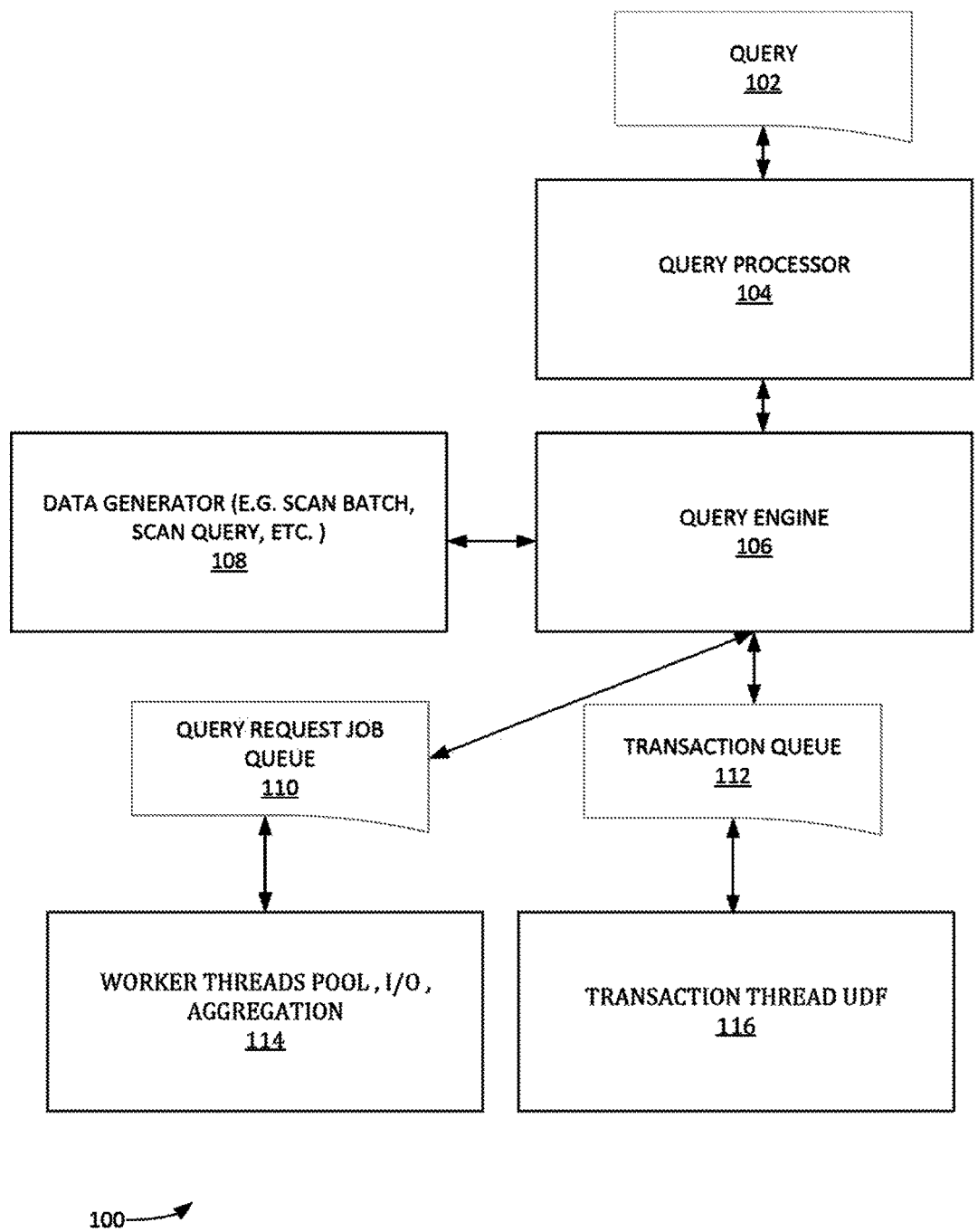
FIG. 1 illustrates example data flow stages of a process of implementing a query engine, according to some embodiments.

The Figures described above are a representative set, and are not an exhaustive with respect to embodying the invention.

DESCRIPTION

Disclosed are a system, method, and article of manufacture of query engine and secondary indexes implemented in a distributed database. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Methods and Systems of a Query Engine Implemented in a Distributed Database The query engine provided herein can be implemented with various data sources like a parallel solid-state drive (SSD) I/O subsystem and/or a current User Defined Function (UDF) framework. The query engine can be an efficient execution subsystem for queries with and/or without associated streams. The query engine can be executed in high parallel multi-threaded manner for real-time execution (e.g. assuming network and/or processing latencies).

FIG. 1 illustrates example data flow stages of a process 100 of implementing a query engine, according to some embodiments. Process 100 can include three basic stages. A query processor (e.g. query processor 104) can be a functionality to receive a query request 102. Query processor can chart out a query execution plan based on the query request. Based on the query execution plan formulated by query processor, a query execution step can invoke a query execution context. System resources and/or trigger submodules can be allocated to perform the work associated with the executing the query.

Based on the request, the stage where list of digests can be generated (e.g. by data generator 108). The digest list can include each stream and/or filter that is to be applied in servicing the query request. Sources used by the generator can be a batch query, a scan query and/or a secondary index query. Generator(s) can be implemented on a per query basis (e.g. utilizing a secondary index traversal, a batch filter, and/or a scan with filter, etc.). It is noted that each query can be associated with a single generator (e.g. one generator per query basis). However, at any given time, there may be many concurrent generators implemented on a single node of a distributed database system. Generator(s) can feed the digest list (e.g. a query request) into a single global queue. The global queue can be the query request job queue 110 (e.g. an automatic repeat request (ARQ)-type query). For each single query, multiple query request generators can be implemented to increase parallelism and to keep tab on the resource utilization.

Query worker(s) can be a functionality to obtain a query request (e.g. from a global request queue) and process it (e.g. pop-from-end). Each query worker can perform various operations based on the particular type of query request including, inter alia: lookups, stream user defined function (UDF and/or record UDF). A lookup can include a process that obtains some or all the relevant records and then returns them to a client.

As used herein, a stream UDF can be a function which is applied to a stream of data. The first argument can be a Lua: stream_ops module. The return value can be the Lua: stream_ops module (optionally augmented with operations). In an implementation of stream UDF, each digest list can be passed into an aggregation framework. The aggregation framework can implement a stream record interface over the digest list and call apply_stream function. All the I/O, opening record/close record triggered from the request from inside Lua apply_stream function. In this way, every stream read can consume a record. A subsequent call to the next stream get can unlock object lock/release partition reservation for a previous record and/or lock and perform a partition reservation for a next record.

A record UDF can be a function which is applied on a single record. The query engine for every digest in the list can create an internal transaction which is then queued for execution (see transaction queue 112). The database node on which the query is running for a partition may not be the master node for transaction. For those cases the request can then be routed to the master node for execution. A record UDF (e.g. transaction thread UDF 116) can be invoked once for each record in the Aerospike Key-Value operation. In one example, a single record can be the target of a KV operation. In general, a record UDF can do the following, inter alia: create/delete bins in the record; read any/all bins of the record; modify any/all bins of the record; delete/create the specified record; access parameters constructed and passed in from the client; and/or construct results as any server data type (e.g. string, number, list, map) to be returned over the wire to the client.

Multiple query worker threads 110 can run in parallel for a given query in order to exploit available SSD-level parallelism. Each worker can be an event-based I/O thread for which the work done for each query request can perform asynchronous I/O and be interleaved for higher disk utilization. There can be multiple query execution thread pools. Based on a specified query setting and selectivity, a query can be moved from one pool to another. Where execution on different pool runs with different priority.

A query worker job can be created based on a partition-core mapping in multi-core system. The batch for the data on a certain partition can be picked up by the worker for that core (e.g. a set of worker threads can be associated with a core and hence the partition they operate on).

The query engine 106 can be stateless. For example, the agreement between client and server for an execution context can be maintained to achieve a pagination effect. The following state can be maintained and/or returned back along with a single page response. The query can define the page size.

Notion offset in the secondary index

Digest returned last to resume from that point

Multi-data source queries can be implemented. A query request can specify multiple-data sources with an 'AND' clause. The query engine can obtain a digest list from the multiple-data source. The query engine can then filter the returned digest list result. For example, the query engine can implement a 'WHERE' clause on the multiple index on the digest list. This can be intersected by the query execution engine before invoking a query generator and/or query worker threads.

A movie mode and/or snap shot can be implemented. Movie mode of operation can be a scheme wherein the worker is passed in list of digests which are read from storage. This can be in the case when processing is to be done. Snap Shot mode can be wherein for the list of selected digests, records are read into the main memory, maintained and fed into the worker to perform operation like aggregations/filter on said records.

Worker priority pools can be implemented. For example, single system can be used to perform the long running as well as short running queries. To achieve ability to prioritize different size jobs worker thread pools can be maintained. The system can be based on query priority. The query job can be moved from one query worker and/or can pool to other query workers (e.g. based on a dampening function and/or a number of records the query worker has read).

Figure 2:
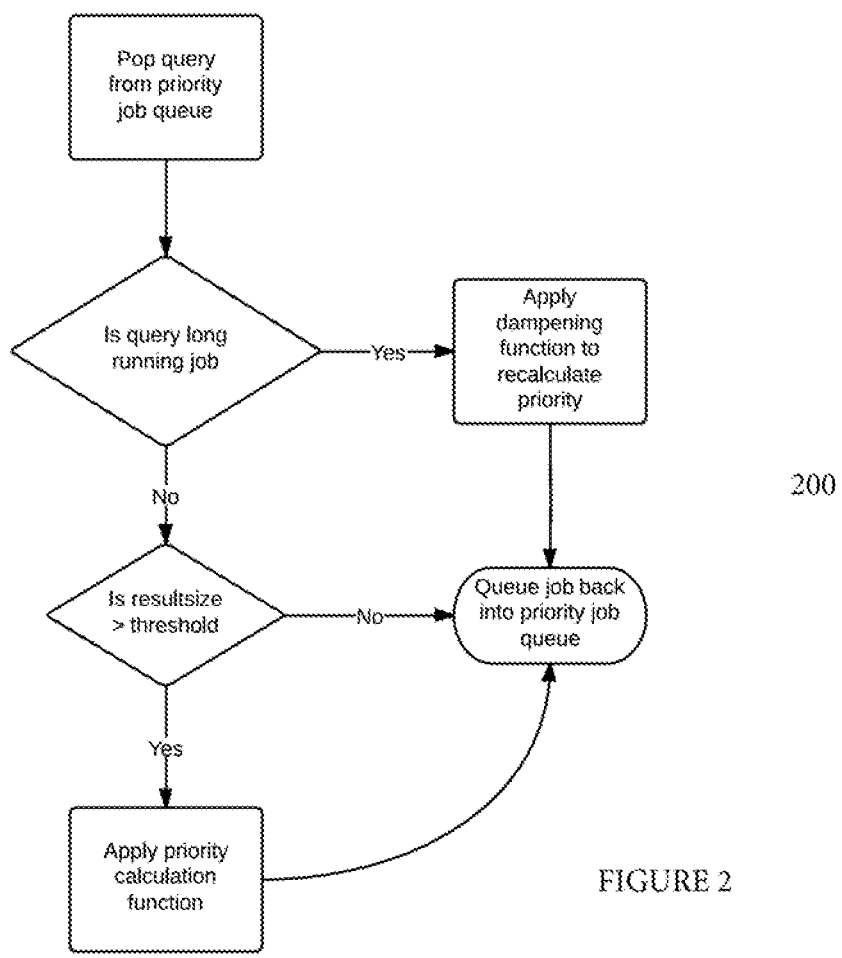
FIG. 2 provides an example of a process of query prioritization, according to some embodiments.

Exemplary Methods and Systems of Secondary Indexes Implemented in a Distributed Database FIG. 2 provides an example of a process 200 of query prioritization, according to some embodiments. A query job can be 'popped' from a priority job queue can be received. It can be determined if the query is a long processing query (e.g. a long running query can be one which has either executed for more than a specified duration of time and/or has read a specified number of records based on configurable value). If 'yes', then a dampening function (e.g. a new priority=old priority+(number of requeue % K (e.g. K can be a dampening factor which can be constant of configurable value)) can be applied to recalculate priority and the job can be placed back into the priority job queue. If 'no', then it can be determined if the result size is greater than a specified threshold. If 'yes', then a priority calculation function can be applied. If, 'no', then the job can be placed back into the priority job queue.

Figure 3:
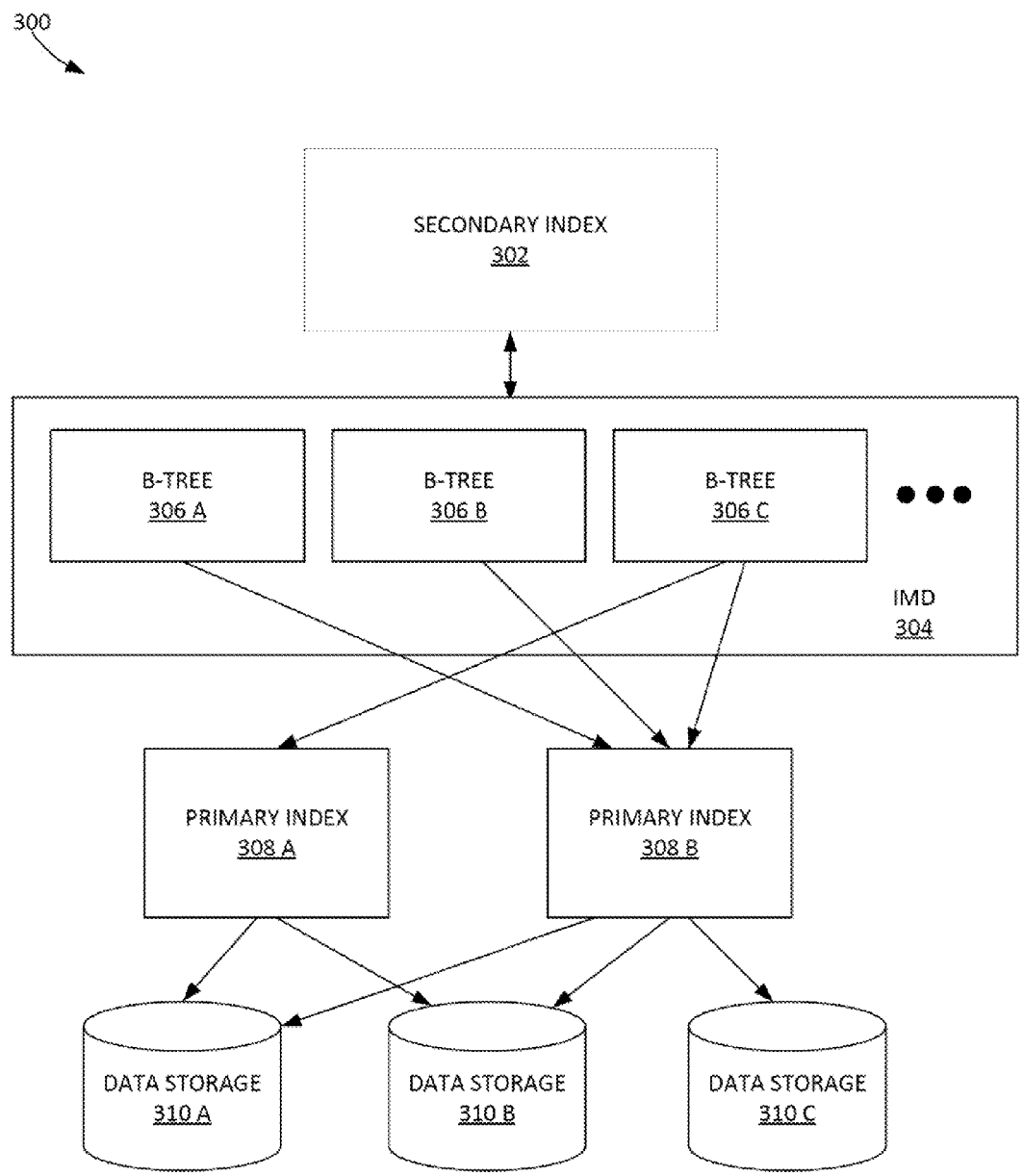
FIG. 3 illustrates an example relationship 300 between a secondary index 302 and one or more primary indexes (e.g. primary index 308 A-B) according to some embodiments.

FIG. 3 illustrates an example relationship 300 between a secondary index 302 and one or more primary indexes (e.g. primary index 308 A-B) according to some embodiments. Secondary Index 302 can be an index in a non-primary key. Secondary index gives ability to model the one to many relationship. Secondary index 302 can be completely in-memory as a hybrid model for a primary key. Secondary index 302 can be maintained for all the nodes and can have records residing on a given node of a distributed database system. In some examples, the secondary index can be a B-tree of a B-tree. The first level B-tree can be on the secondary index key and point to the B-tree of the digest (e.g. the key in the primary index). In one example, index metadata (IMD) 304 can include a set of B-trees 306 (e.g. thirty-two B-trees).

There can be k-number physical indexes (e.g. any variable number physical indexes such a primary indexes 308 A-B) corresponding to a logical secondary index. A secondary index key can be hashed to a physical index for read/write operations. In one example, the hash function can implement a round robin distribution based for the integer keys. In one example, the hash function can be a 20 byte RIPEMD160 digest created from a set of string keys.

Secondary index 302 can be associated with a bin name and type. Secondary index 302 can have entry for a record when information about a bin with certain bin type is provided. For example, if there numeric index on category. The secondary index entry can be created only for the category with a numeric entry. In some examples, no entry for record without a designated bin and/or with string data can be made. In this sense, it can differ from general implemented of a secondary index. The index association with type would avoid indexing of any value of type other than numeric for the bin category.

Example secondary index 302 operations are now provided. Secondary index 302 can be create and/or deleted while online without taking data offline. When secondary index 302 is created, a background primary index scan can be initiated. The primary index scan can walks through a primary index and populate the secondary index entry. While the scan is performed any update to the primary index can be ingested into secondary index. Once the primary index scan is finished the primary index is marked as ready for read further operations. In the event of a cluster state change as the data moves from a one database node to another database node (e.g. node 'A' to node 'B') during a data migration operation, the updates to a primary index can be are performed in parallel to the updates to the secondary index (e.g. in parallel).

Write operations in database system 300 can replicated to a replica node. Along with the data write, the update to the secondary can also be shipped over the wire to the replica node. These updates to the replica node can be data information and can be idempotent in nature (e.g. operations can be applied multiple times without changing the result beyond the initial application). Updates to the primary index and/or secondary index, when performing write operations can be done in several ways including, inter alia: synchronously under the record lock and/or asynchronously.

An example of an asynchronous update operations is now provided. In a system with a large number of indexes, updates to the primary index and or secondary index cap be performed asynchronously by queuing the updates to a secondary index update thread while replica copy updates are in progress. This is to avoid incurring latency of the secondary index update. The reply is sent back to client only if updates are done to primary and secondary on all the nodes master copy and replica copy.

An example of query nodes operations is now provided. When a query is performed, the secondary index query execution can be implemented such that it is served with query to subset of the set of database nodes with a secondary index. A result can be returned. A query node which can be a database node on which a particular partition can be read when the query reaches the respective database node.

Read and/or lookup operations can be allowed if a secondary index is in an ACTIVE state with reading enabled. Also the lookup and/or read requests can specify the bin name in the request. If no matching index is found the query request can return no result. After fetching the digest list from a secondary index record list can be formed and a result can be returned to a client (e.g. based on the following two decision provided infra).

A digest-related decision of whether the partition to which the digest belongs is queriable on a given node (e.g. if the node is QNODE for a given partition). If it is not, then the partition (and hence the digest) can be ignored. A secondary index could be stale if the record does not have entry in the primary index. In this case, the secondary index can be ignored.

A Paxos algorithm can be implemented to ensure the database nodes have information about the partition size on the nodes in a current cluster view. The node with the largest size data can be designated QNODE for that partition. At the end of a partition balance code, the database nodes can store information in a partition point to the database node designated as the QNODE. The following rules can govern this process. In the case where multiple database nodes are of the same size data, the lowest node in the partition-node hash list can be designated as the QNODE (e.g. in the following order: master>replica>non replica). Each database node can have the same view of the data, hence each can make unilateral decision. On a master node, about a QNODE points to the current QNODE. On all the other database nodes, the QNODE points to the master node. If during a data migration process, the data size increases at the database node designated as the master node for a given partition. When the data at the master nodes attains a stable state, the latest data can then be propagated to the other database nodes. If the largest database node is the originally selected as the master node then it can also be the QNODE. If the largest database node originally selected is not the master node, at the point when QNODE is done migrating data to the master node, then both nodes can flip (e.g. the QNODE to point to master node). All the other database nodes can point to the master node as the QNODE (e.g. at the point when size of data at the master node goes beyond largest in the cluster it notifies the largest node with the acknowledgement to indicate that it no more need to serve request and master node becomes QNODE for that partition). Because the notification happens in parallel to a client request, a client query interface can be enhanced to maintain a map of the partition to database node mapping. When first data for a given partition is received from a certain node, the map can be created. Subsequent data for a given partition from some different node can be rejected. The idea is to get data only from one node and have the database cluster be more deterministic. When a migration is not running and the database cluster is in stable state, the master node can be the QNODE for a partition. The master node can become the QNODE after migration is finished. See FIG. 5B infra for an exemplary process of QNODE management, according to some embodiments.

It is possible that the database node designated as the QNODE is not in the replica list. In this case, the data can be served from the non-primary/non-replica version. Because current non-primary versions may not take new writes, the query could end up serving old data. New changes can be added when this state is detected to make sure that both the QNODE takes the writes. In case QNODE is master then this can be a 'no-op'.

A user-defined index can be implemented. The database system can provide an API through user-defined functions (UDF) to manipulate secondary indexes. When a write is performed the UDF can be run. The user can run functional logic on the record and/or determine the data to index. The association of the indexes in these case is with the namespace and set. If there is no bin or type defined, then the user can index a functional result based on a functional index as supported in RDBMS. In another example, the user can select the data from a complex data type like MAP/LIST/LDT in order to add and/or remove from the index at the time write is performed.

Additional Systems and Architecture

Figure 4:
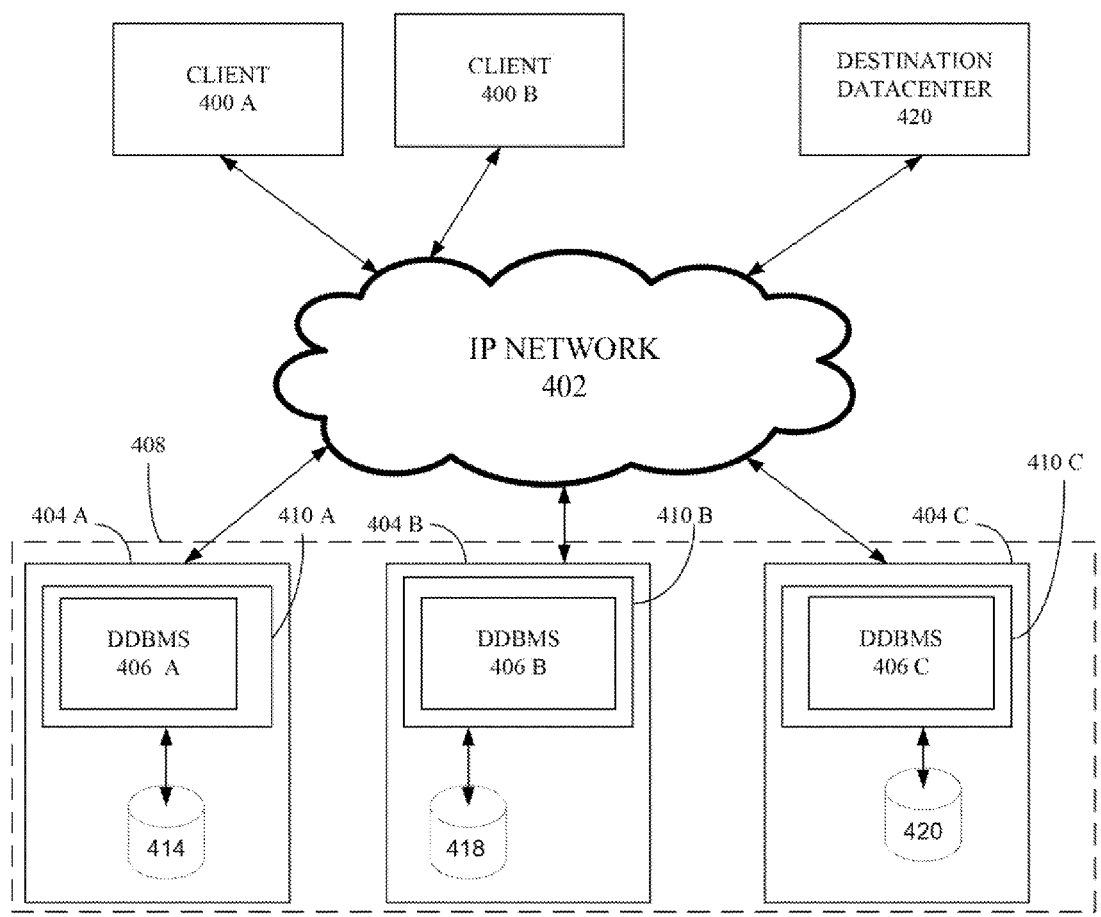
FIG. 4 shows, in a block diagram format, a distributed database system (DDBMS) operating in a computer network according to an example embodiment.

FIG. 4 shows, in a block diagram format, a distributed database system (DDBMS) operating in a computer network according to an example embodiment. The DDBMS of FIG. 4 can typically be a collection of databases that can be stored at different computer network sites (e.g. a server node). Each database may involve different database management systems and different architectures that distribute the execution of transactions. The DDBMS can be managed in such a way that it appears to the user as a centralized database.

The DDBMS can be a distributed, scalable NoSQL database, according to some embodiments. The DDBMS can include, inter alia, three main layers: a Client layer 400 A-B, a distribution layer 410 A-N and/or a data layer 412 A-N. Client layer 400 A-B can include various DDBMS client libraries. Client layer 400 A-B can be implemented as a smart client. For example, Client layer 400 A-B can implement a set of DDBMS application program interfaces (APIs) that are exposed to a transaction request. Client layer 400 A-B can also track cluster configuration and manage the transaction requests, making any change in cluster membership completely transparent to the customer application 404 A-N.

Nodes 404 A-C can communicate to clients 400 A-B via IP network 402. Internet-protocol (IP) network 402 can utilize a set of communications protocols used for the Internet and other similar networks. In some embodiments, IP network 402 may also include other means of data communication such as a local area network (LAN) that utilizes IEEE 802-type protocols, a telecommunications data network, or any combination thereof. Clients 400 A-B can be any application or process that communicates with nodes 404 A-C via IP network 402.

Nodes 404 A-C can include one or more central processing units (CPU), memory resources and permanent data storage systems. Database nodes 404 A-C can include distributed database management system (DDBMS) 406 A-C.

DDBMS 406 A-C can include a set of computer programs that controls the creation, maintenance, and the use of distributed database of cluster 408. DDBMS 406 A-C manages the various data storage systems 414, 418 and 420 that comprise the distributed database as well as the data objects on the data storage systems. The particular example embodiment of FIG. 4 shows DDBMS 406 A-C as a distributed database manager layer. The DDBMS 406 A-C can include components that are able to execute database tasks on their respective servers 410 A-C, and to carry out functions (described infra) that relate to the operation of the DDBMS in cluster 408. Each DDBMS can include a CLD (e.g. a database server instance) and a corresponding XDR process. In some examples, these XDR processes can fork a write operation to the DDBMS and record related information such as which keys were added/updated. Later these changes can be shipped asynchronously to a destination datacenter (e.g. can be a remote datacenter). It is noted that the DDBMS 406 A-C can synchronize their clocks such that the nodes of the cluster can be substantially synchronized. In this way, in the event of a node failure, the remaining nodes can correctly takeover the responsibility for shipping the data of the failed node.

Destination datacenter can include similar systems (e.g. multiple database nodes with a distribution layer) to database cluster 408. Database cluster 408 can be a client of destination datacenter. The nodes of destination datacenter can be accessible over plain TCP protocols and connections. However, in some embodiments, a secured shell (SSH) tunnel can be established with a local port forwarding utilized by an XDR process. Similarly, a virtual private network (VPN) tunnel can be established between database cluster 408 and destination datacenter. In this case, an XDR process can use the VPN for shipping and/or other communications described herein. It is further noted that the namespace settings on both database cluster 408 and destination datacenter can be identical. It is noted, that in some examples, the datacenter can have different cluster configuration like number of nodes and memory etc.

At the application layer of the database nodes 404 A-C can manage the processing of data transactions. For the sake of simplicity, not all the components of nodes 404 A-C are shown. However, it will be appreciated that nodes 404 A-C can include other components. For example, DDBMS 406 A-C can include systems as lock managers, schedulers, metadata managers, policy managers and the like. In some embodiments, nodes 404 A-C can be self-managing nodes that can reconfigure the cluster and repartition data within the cluster without a central administrative entity such as a database administrator (DBA).

Nodes 404 A-C can be linked together via internal interconnect 424. Fibre Channel protocols can use a transport protocol (similar to TCP used in IP networks) which predominantly transport small computer system interface (SCSI) commands over a Fibre Channel network. SCSI commands are typical a set of standards for physically connecting and transferring data between computers and peripheral devices. In some embodiments, TCP/IP protocols can be used to communicate between nodes.

Additionally, nodes 404 A-C can also include one or more data storage devices 414, 418 and 420 (e.g. a dynamic random-access memory (DRAM), rotating hard disk, solid-state drive (SSD), or any combination thereof) or file systems. Each data storage device 414, 418 and 420 can have a set of metadata that uniquely identifies the data it stores and the data attributes (e.g. time stamps and the like) to the DDBMS that manages the particular storage device.

An SSD device can be a data storage device that uses solid-state memory to store persistent data with the intention of providing access in the same manner of a block input/output hard disk drive. DRAM can be a type of random-access memory that stores each bit of data in a separate capacitor within an integrated circuit. The capacitor can be either charged or discharged; these two states are taken to represent the two values of a bit (0 and 1). A hard-disk drive can be a non-volatile magnetic data storage device in which data is digitally recorded by various electronic, magnetic, optical, or mechanical methods on a surface layer deposited on one or more planar, round and rotating platters.

Distribution layer 410 A-N can be implemented as one or more server cluster nodes 408 A-N. Cluster nodes 408 A-N can communicate to ensure data consistency and replication across the cluster. Distribution layer 410 A-N can use a shared-nothing architecture. The shared-nothing architecture can be linearly scalable. Distribution layer 410 A-N can perform operations to ensure database properties that lead to the consistency and reliability of the DDBMS. These properties can include atomicity, consistency, isolation, and durability.

In addition, distribution layer 410 A-N can ensure that the cluster remains fully operational when individual server nodes are removed from or added to the cluster. On each server node, a data layer 412 A-N can manage stored data on disk. Data layer 412 A-N can maintain indexes corresponding to the data in the node. Furthermore, data layer 412 A-N be optimized for operational efficiency, for example, indexes can be stored in a very tight format to reduce memory requirements, the system can be configured to use low level access to the physical storage media to further improve performance and the like. It is noted, that in some embodiments, no additional cluster management servers and/or proxies need be set up and maintained other than those depicted in FIG. 4.

Figure 5A:
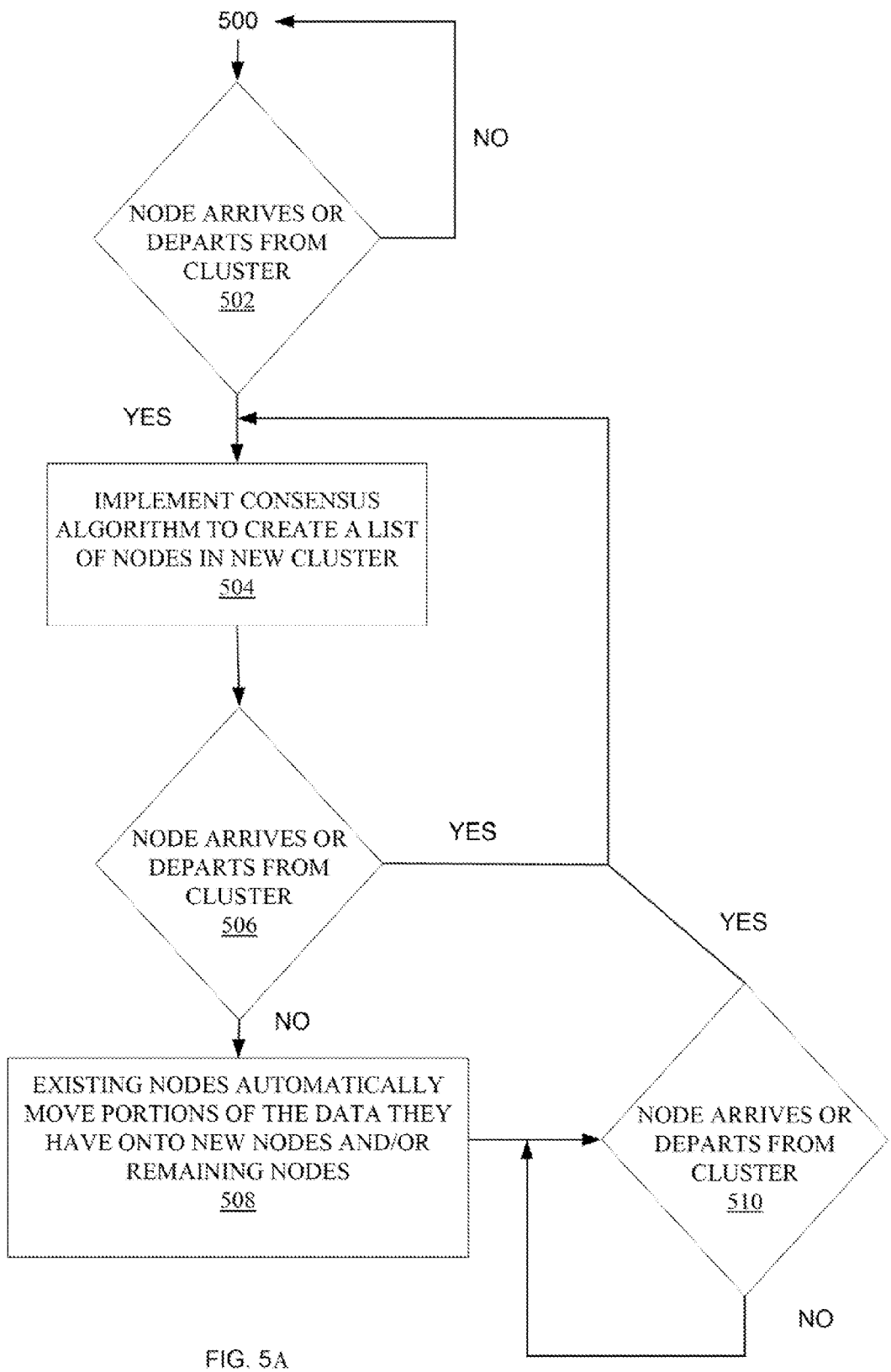
FIG. 5A illustrates an exemplary process for self-managing nodes of a distributed database cluster such as the DDBMS of FIG. 4 according to some embodiments.

FIG. 5A illustrates an exemplary process for self-managing, nodes of a distributed database cluster such as the DDBMS of FIG. 4. In step 502 of process 500, it is determined if one or more nodes have arrived OF departed from the cluster. In an example embodiment, step 502 can be performed with various mechanisms for determining node arrival to and departure from the cluster such as a multicast discovery protocol and/or a script interface for integration with external management systems. Each database node can include a persistent and unique identifier that the node periodically transmits to a 'heartbeat' address. Each node then monitors the received heartbeat transmissions from the other member nodes in the cluster to automatically detect when a new database node has come into service or when an existing database node has failed. A database node can be determined to have failed when its 'heartbeat' stops (i.e. the heartbeat transmission fails to arrive within a specified period) or when transactions involving that database node are faulty according to a specified tolerance parameter.

If the remaining nodes determine that one or more nodes have arrived or departed from the cluster, step 504 then implements a consensus algorithm (e.g. a Paxos algorithm) to create a list of new nodes in a reconfigured cluster. In one example embodiment, the remaining nodes can implement a consensus-based voting process. The instructions for the consensus-based voting process exist in each node of the cluster. Once a new list of extant nodes is created by the consensus-voting process, the existing nodes in the cluster can then automatically migrate portions of the data they have onto the new nodes or the remaining nodes (see step 508).

In an example embodiment, a modified Paxos algorithm can be utilized as the consensus-voting process. For example, a principle node can be elected. The principle node can then utilize a two-phase commit process to determine the state of the nodes. If another node provides a commit in response to the principle node's request, then it can be included in the new cluster. In such an example, it should be noted that the Paxos algorithm is used to generate a list member nodes of the new cluster. In this particular example, the remaining steps of reconfiguring the new cluster (such as synchronizing data between nodes and/or partitioning data among nodes) can be performed by another step (such as step 508) that does not use the Paxos algorithm. For three or more nodes, typically, the Paxos algorithm defines a quorum as a family of subsets of the set of acceptor nodes such that any two subsets from the family (that is, any two quorums) have a non-empty intersection. A quorum can be any majority of participating acceptor nodes. For example, given the set of acceptor nodes {A,B,C,D}, a majority quorum would be any three acceptor nodes: {A,B,C}, {A,C,D}, {B,C,D}. However, the Paxos algorithm of the example embodiment can be modified in order to proceed with one or two extant nodes. For example, if only one node remains, than the single node forms the new cluster with a quorum of one for implementation of the Paxos algorithm. If two nodes remain, then the two nodes can form a quorum for implementation of the Paxos algorithm.

In step 506, it is again determined if one or more nodes have arrived or departed from the cluster. If step 506 returns a positive response then process 500 returns to step 504. If step 506 returns a negative response, process 500 continues to step 508. In step 508, remaining nodes automatically migrate portions of the data (and, in some embodiments, metadata about the data) to the new nodes or the remaining nodes (i.e. with a data migration operation). In one embodiment, metadata (e.g. a namespace directory of the data in the cluster) can be maintained in each node of the cluster. Thus, each node of the cluster has access to the previous state of cluster and thus determines a current location of data. An automatic data redistribution process can then be implemented to determine how data should be distributed in the new cluster configuration following one or more data migration techniques such as process 400. The attributes of the data redistribution process can vary according to such factors as the particular replication factor (how many copies of a piece of data are maintained) of the cluster.

In step 510, it is again determined if one or more nodes have arrived or departed from the cluster. If step 506 returns a positive response then process 500 returns to step 504. If step 506 returns a negative response, process 500 continues to periodically repeat step 510.

Figure 5B:
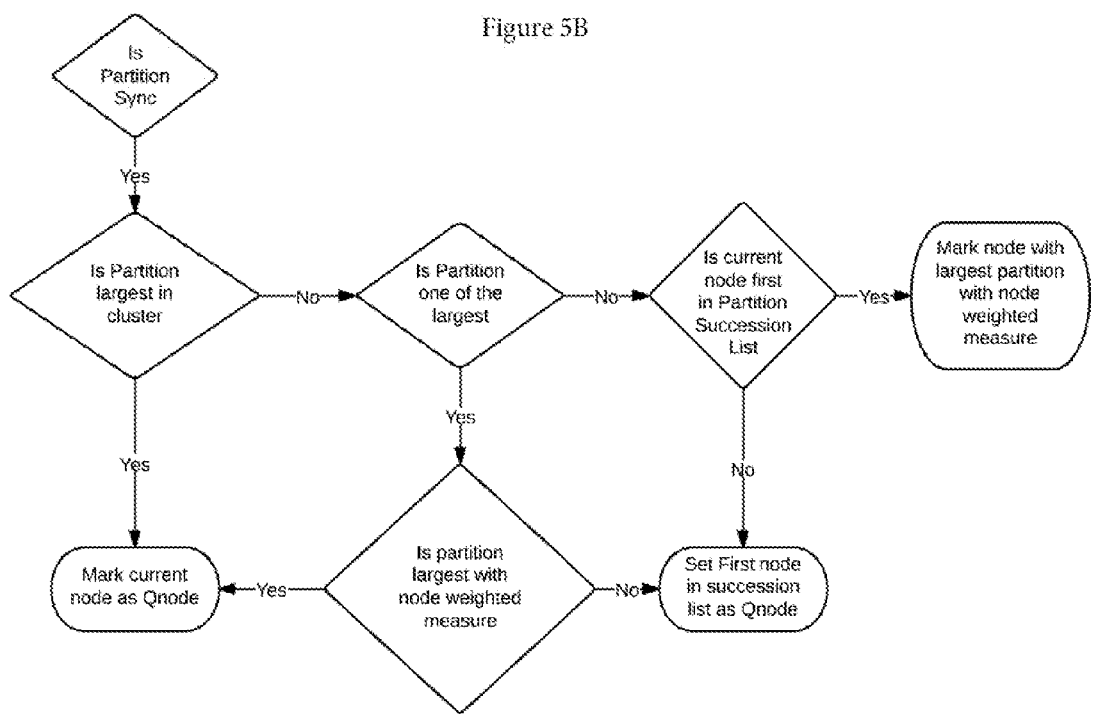
FIG. 5B for an exemplary process of QNODE management, according to some embodiments.

FIG. 5B for an exemplary process of QNODE management, according to some embodiments. It can be determined if a partition synchronization (e.g. synchronizing metadata information related to partition on various node using a Paxos algorithm) is being performed. If 'yes', then it can be determined if the partition is the largest partition in the database cluster. If 'yes', then the current database node can be marked as the QNODE. If 'no', then it can be determined if the partition is one of the largest partitions in the database cluster (e.g. in a specified n-number of largest database nodes). If 'yes', it can be determined if the partition is the largest according to a 'node-weighted' measure. For example, consider a succession list to be A->B->C. A succession list can be list of node where a data for certain partition is stored. The first in the order can be a master of all subsequence nodes are replicas. If a replication factor is 1 then data can be stored in first replica and rest nodes are empty. The first node in the replica list can be a master node. A weighted measure can be defined as QNODE=Max (e.g. size of partition—(position of node in succession list*weight factor). A weight factor can be a configurable constant or dynamically adjusted based on the consistency guarantee. If 'yes', then the current database node can be marked as the QNODE. If 'no', then the database node can be set as first in succession list to be designated as QNODE. If the partition is not one of the largest in the database cluster, then it can be determine if the current database node is first in a current partition succession list. If 'no', then the database node can be set as first in succession list to be designated as QNODE. If 'yes', then the database node with the largest partition can be marked with a node-weighted measure.

Figure 6:
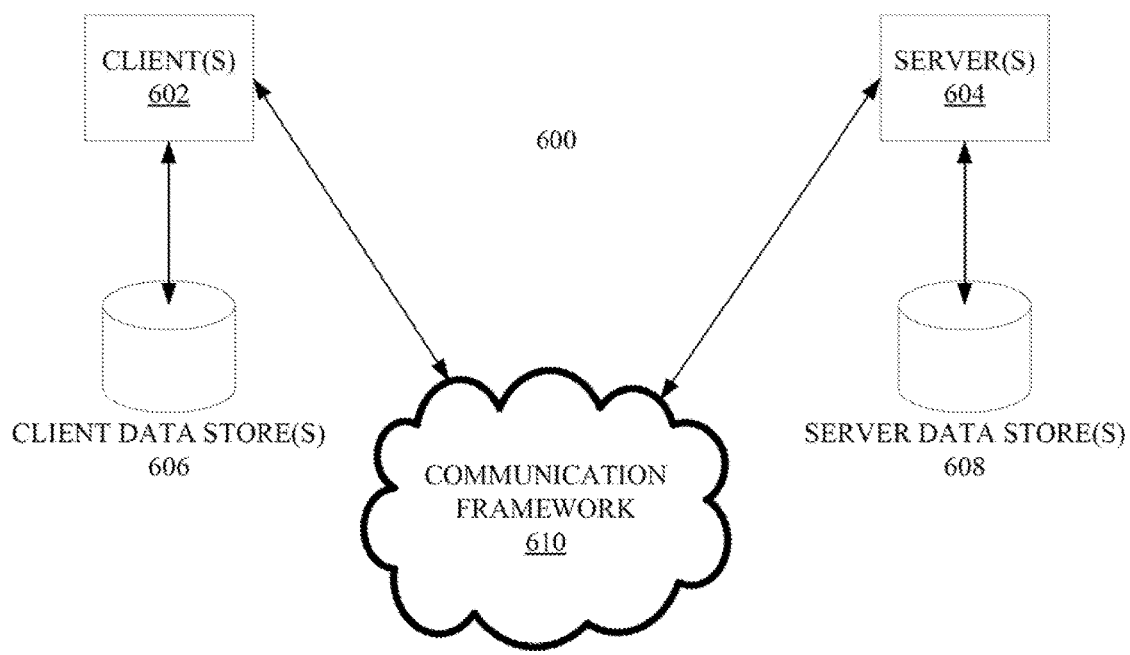
FIG. 6 is a block diagram of a sample computing environment that can be utilized to implement various embodiments.

FIG. 6 is a block diagram of a sample computing environment 600 that can be utilized to implement various embodiments. The system 600 further illustrates a system that includes one or more client(s) 602. The client(s) 602 can be hardware and/or software (e.g., threads, processes, computing devices). The system 600 also includes one or more server(s) 604. The server(s) 604 can also be hardware and/or software threads, processes, computing devices). One possible communication between a client 602 and a server 604 may be in the form of a data packet adapted to be transmitted between two or more computer processes. The system 600 includes a communication framework 610 that can be employed to facilitate communications between the client(s) 602 and the server(s) 604. The client(s) 602 are connected to one or more diem data store(s) 606 that can be employed to store information local to the client(s) 602. Similarly, the server(s) 604 are connected to one or more server data store(s) 608 that can be employed to store information local to the server(s) 604.

Figure 7:
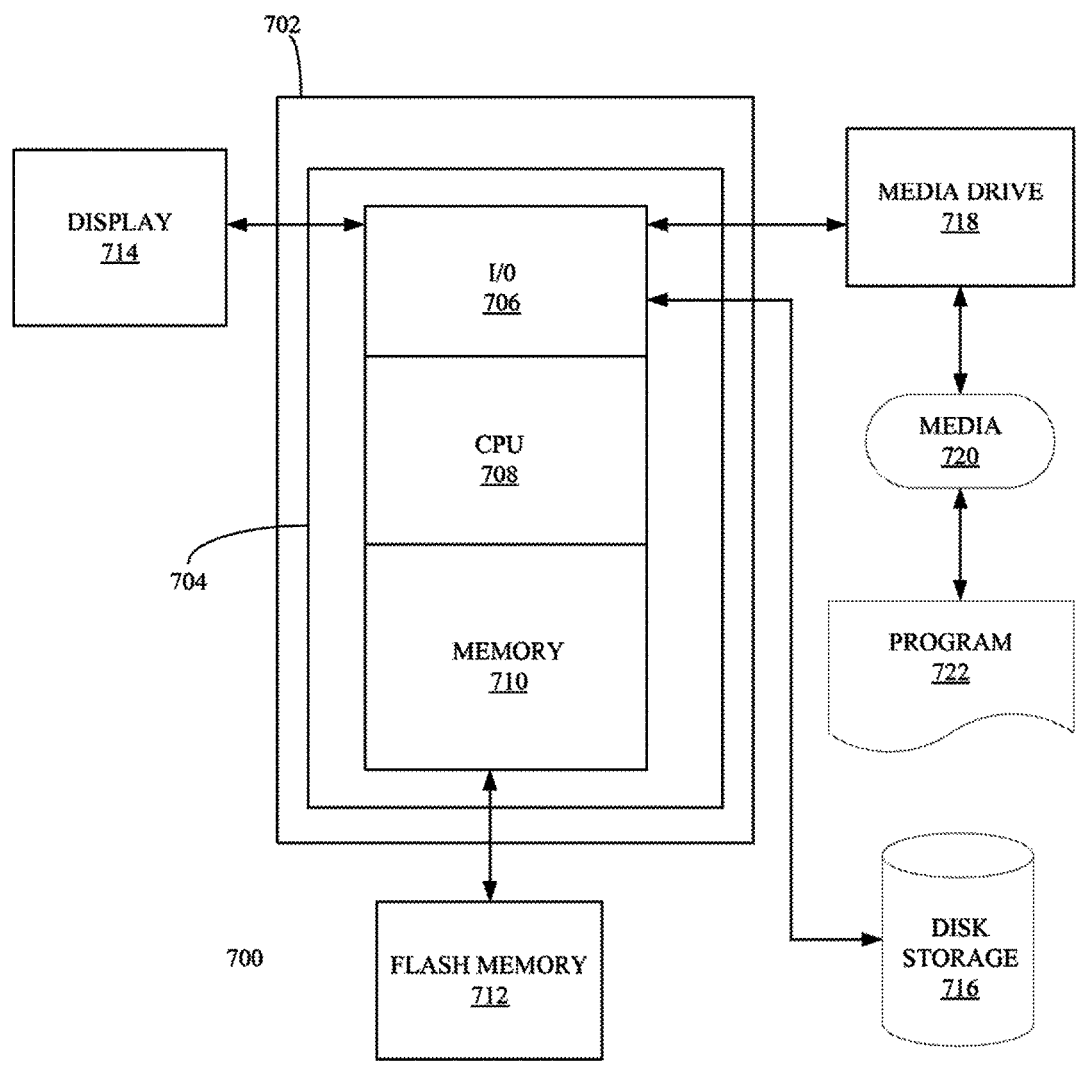
FIG. 7 depicts an exemplary computing system that can be configured to perform any one of the processes provided herein.

FIG. 7 depicts an exemplary computing system 700 that can be configured to perform any one of the processes provided herein. In this context, computing system 700 may include, for example, a processor, memory, storage, and I/O devices (e.g., monitor, keyboard, disk drive, Internet connection, etc.). However, computing system 700 may include circuitry or other specialized hardware for carrying out some or all aspects of the processes. In some operational settings, computing system 700 may be configured as a system that includes one or more units, each of which is configured to carry out some aspects of the processes either in software, hardware, or some combination thereof.

FIG. 7 depicts computing system 700 with a number of components that may be used to perform any of the processes described herein. The main system 702 includes a motherboard 704 having an I/O section 706, one or more central processing units (CPU) 708, and a memory section 710, which may have a flash memory card 712 related to it. The I/O section 706 can be connected to a display 714, a keyboard and/or other user input (not shown), a disk storage unit 716, and a media drive unit 718. The media drive unit 718 can read/write a computer-readable medium 720, which can contain programs 722 and/or data. Computing system 700 can include a web browser. Moreover, it is noted that computing system 700 can be configured to include additional systems in order to fulfill various functionalities. Computing system 700 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 8:
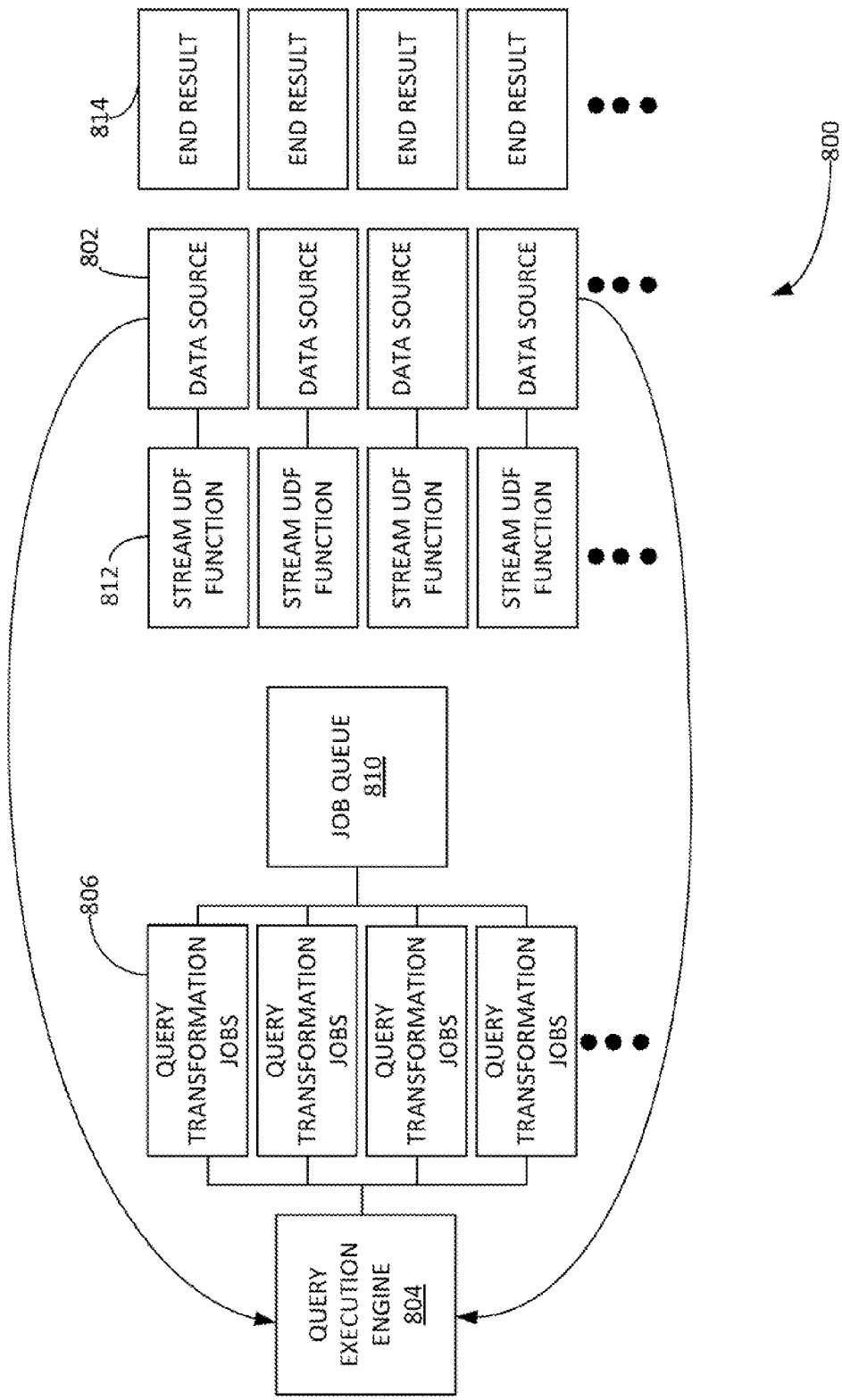
FIG. 8 illustrates a system that includes various data transforms and query engine flows through different stages, according to some embodiments.

FIG. 8 illustrates a system 800 that includes various data transforms and query engine flows through different stages, according to some embodiments. Data source(s) 802 (e.g. a batch query, a scan query, a secondary index query, etc.) can communicate with query engine 804. Query engine 804 can receive from multiple data sources 802. Query engine 804 can perform any of the above described processes associated with other descriptions of a query engine. Query engine 804 can perform shuffling activities such 'GROUP BY' operations and the like. Query engine 804 operates on query transformation jobs 806. This step can include a transformation of an incoming value into new form. For example, if the incoming previous value is a list of email addresses of a user then the transformation can pick the most frequently access email-address. Job queue 808 can be a priority job queue and/or a query request job queue 110 as provided in process 200 supra. For example, when executing query, a single query could create multiple jobs to have a parallel execution. A job queue can be a single global queue that is fed by a query execution thread and/or consumed by an associated worker thread (e.g. see FIG. 1 block 114). Stream UDF function 812 can produce both data (e.g. a stream UDF process with a stream of data and produce stream of data as output) for the stream UDF stages downstream and/or end results 814. A stream UDF stage can be, infer alia, a transformation function, a sort function and/or an aggregation function. It is noted that data can flow through multiple stream UDF stages, mix and match of which can used to define business logic to run inside database (e.g. see the arrows from data sources 802 to query execution engine 804).

CONCLUSION

Although the present embodiments have been described with reference to specific example embodiments, various modifications and changes can be made to these embodiments without departing from the broader spirit and scope of the various embodiments. For example, the various devices, modules, etc, described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method of a distributed database system comprising:
   providing a query processor to receive a query request and to chart out a query execution plan based on the query request;
   providing a data generator to generate a digest list based on the query request, wherein the list of digests comprises each stream or filter applied in servicing the query request;
   providing a query engine to obtain a digest list from a multiple-data source as a result of the query request and to filter the digest list;

providing a query worker to obtain the query request and process the query request based on a type of the query request; and providing one or more query worker threads to perform an asynchronous I/O operation for the query request, wherein the one or more query work threads run in parallel for a given query using an SSD-level parallelism attribute, and wherein a query worker thread comprises an event-based I/O thread.

2. The computer-implemented method of claim 1, wherein the query request comprises a lookup operation or a stream user defined function.

3. The computer-implemented method of claim 1, wherein the query engine creates an internal transaction which is then queued for execution for every digest in the digest list.

4. The computer-implemented method of claim 1, wherein based on the query execution plan formulated by the query processor, a query execution step can invoke a query execution context.

5. The computer-implemented method of claim 4, wherein the query execution plan allocates at least one system resource and a trigger submodule to perform work associated with the query request.

6. The computer-implemented method of claim 1, wherein the query engine is implemented in a not-only structured query language (SQL) database.

7. The computer-implemented method of claim 1, wherein the query engine is stateless.

8. The computer-implemented method of claim 1, wherein a source used by the data generator can be a batch query, a scan query or a secondary index query, and wherein the data generator is implemented on a per query basis.

9. The computer-implemented method of claim 1, wherein the lookup operation comprises a process that obtains at least relevant record from a database then returns the at least one relevant record to a client entity.

10. The computer-implemented method of claim 1, wherein a query worker job is created based on a partition-core mapping in a multi-core system.

11. The computer-implemented method of claim 1, wherein query worker threads are interleaved for higher SSD device utilization.

12. The computer-implemented method of claim 1 further comprising:

feeding the digest list into a global queue, wherein the global queue comprises a query request job queue, and for each query, one or more query request generators are implemented to increase parallelism and to track on the resource utilization.

13. A computerized-system comprising:

a processor;

a memory containing instructions when executed on the processor, causes the processor to perform operations that implement:

a query processor to receive a query request and to chart out a query execution plan based on the query request;

a data generator to generate a digest list based on the query request, wherein the list of digests comprises each stream or filter applied in servicing the query request;

a query engine to obtain a digest list from a multiple-data source as a result of the query request and to filter the digest list;

a query worker to obtain the query request and process the query request based on a type of the query request; and one or more query worker threads to perform an asynchronous I/O operation for the query request, wherein the one or more query work threads run in parallel for a given query using an SSD-level parallelism attribute, and wherein a query worker thread comprises an event-based I/O thread.

* * * * *